Patented Aug. 31, 1943

2,328,352

UNITED STATES PATENT OFFICE 2,328,352

LIQUID COMPOSITION CONTAINING POLYMERIZED CHLOROPRENE

Alexander D. Macdonald, Malden, Mass., assignor to B. B. Chemical Co., Boston, Mass., a corporation of Massachusetts No Drawing. Original application January 31, 1940, Serial No. 316,513. Divided and this application November 3, 1941, Serial No. 417,682

5 Claims. (Cl. 260—32)

This invention relates to polymerized chloroprene and more particularly to liquid compositions prepared from malodorant-free plastic polymers of chloroprene.

This is a division of my copending application, Serial No. 316,513, filed January 31, 1940.

Plastic polymerized chloroprene is chloroprene (also known as chloro-2-butadiene-1,3) which has been polymerized to such an extent that it may be worked on the rolls of a rubber mill and compounded with other ingredients in a manner similar to that in which crude rubber is treated. Such plastic polymerized chloroprene may be "cured" to a condition in which it resembles vulcanized rubber in exhibiting essentially elastic rather than plastic properties. This "curing" of plastic polymerized chloroprene, often spoken of as "vulcanization," appears to be a further polymerization of the chloroprene as distinguished from the vulcanization of rubber wherein sulphur is considered to be added to the molecule of the rubber hydrocarbon.

For many purposes the malodorant character of commercial polymerized chloroprene was disadvantageous and to overcome this difficulty I made the inventions described in United States Letters Patent Nos. 2,067,854 and 2,107,796, which are directed to the preparation of malodorant-free plastic polymerized chloroprene from commercial polymerized chloroprene. The present invention makes it possible to prepare in advance liquid dispersions of malodorant-free plastic polymerized chloroprene which will retain their liquidity and free-flowing qualities for substantial periods of time and, when occasion requires, they may quickly be associated with suitable compounding ingredients, including curing agents, depending upon the particular use to which the liquid dispersions are to be put.

An object of this invention is to provide improved liquid compositions embodying malodorant-free plastic polymerized chloroprene. Other objects are to provide such compositions having improved stability, that is, increased resistance to thickening and gelling over a period of time, and which may be stored for substantial periods of time without deterioration.

According to the present invention the above and other objects are attained by incorporating a salt of the group consisting of sodium formate (HCOONa) and sodium acetate (NaC$_2$H$_3$O$_2$) in the dispersion or colloidal solution of plastic polymerized chloroprene. I have found sodium acetate to be especially useful because of its availability, low cost and effectiveness. Compositions so treated have stood at temperatures as high as 105° F. for many weeks without gelling or undue thickening, whereas compositions containing no stabilizing materials have increased greatly in viscosity and actually gelled in much shorter periods of time.

The salt of the group described above preferably is present in the composition to the extent of about 1 to 10% by weight of the polymerized chloroprene present. I have found that about 3% of the salt functions very satisfactorily.

I have conducted aging tests of liquid dispersions made in accordance with this invention, the results of which are given hereinbelow. I selected 105° F. as the temperature at which to conduct these tests, because liquid dispersions of polymerized chloroprene ordinarily are less stable at elevated temperatures, and 105° F. represents the maximum temperature at which such dispersions ordinarily would be stored. In these tests dispersions in toluene of malodorant-free plastic polymerized chloroprene, which had been deodorized in the manner described in Patent No. 2,067,854, were prepared with a concentration of about 2 pounds of the polymerized chloroprene to the gallon of solution. In each case 3% of the salt was incorporated in the liquid composition. These compositions were then stored in a constant temperature chamber at 105° F. The following table illustrates the efficacy of the salts coming within the scope of this invention and shows the viscosity of the solutions at the beginning of the test and after 8 weeks' constant exposure to a temperature of 105° F. except where the composition had gelled prior to the expiration of the 8 weeks' period.

| Salt | Viscosity of liquid composition at beginning of test (seconds) | Viscosity after 8 weeks at 105° F. (seconds) |
|---|---|---|
| None | 27½ | (¹) |
| Sodium formate (HCOONa) | 25 | 63 |
| Sodium acetate (NaC$_2$H$_3$O$_2$) | 21 | 36½ |

¹ Gelled after 6 weeks.

The viscosity mentioned hereinabove refers to the number of seconds required for a steel ball of 9.5 mm. (⅜" diameter) and weighing from 3.45 to 3.55 grams to drop 50 cm. through a sample of the liquid maintained at 25° C. in a glass tube of 19 mm. inside diameter.

From the above test results it will be observed that while ordinarily there was a relatively small increase of viscosity such increase is well within the limits normally to be expected from such colloidal dispersions. The above compositions after storage were all suitable for the uses to which such compositions ordinarily are put.

The salt may be incorporated in the polymerized chloroprene dispersion in any suitable manner. Thus, the salt in finely powdered state may be milled into the polymerized chloroprene on a suitable rubber mill. The milled material then may be sheeted, cut up into relatively small pieces, and dissolved in a suitable solvent, such as benzene, trichlorethylene, toluene, Solvesso, alone or in mixtures, or the solvent may be associated with a non-solvent such as ethyl acetate or naphtha. Alternatively, the polymerized chloroprene may be associated with the solvent in a Werner-Pfelderer mixer and the salt added to the composition preferably while the solution still is quite viscous. Furthermore, the salt in the form of a solution thereof in a suitable solvent may be added to a solution of the polymerized chloroprene.

When it is desired to use the liquid dispersion of this invention for coating, adhesive or other purposes, it may be so used in certain instances without change or it may be diluted with a suitable liquid diluent, or, if desired, compounding ingredients of the type well known in the art may be incorporated in the liquid dispersion.

Having described my invention, what I claim as new and desire to secure by Letters Patent of the United States is:

1. A liquid composition comprising malodorant-free plastic polymerized chloroprene dispersed in an organic solvent, said composition being characterized by resistance to thickening and gelling over a substantial period of time and by the presence therein of a salt of the group consisting of sodium formate and sodium acetate.

2. A liquid composition comprising malodorant-free plastic polymerized chloroprene dispersed in an organic solvent, said composition being characterized by resistance to thickening and gelling over a substantial period of time and by the presence therein of about 1 to 10% of a salt of the group consisting of sodium formate and sodium acetate.

3. A liquid composition comprising malodorant-free plastic polymerized chloroprene dispersed in an organic solvent, said composition being characterized by resistance to thickening and gelling over a substantial period of time and by the presence therein of about 3% of sodium formate (HCOONa).

4. A liquid composition comprising malodorant-free plastic polymerized chloroprene dispersed in an organic solvent, said composition being characterized by resistance to thickening and gelling over a substantial period of time and by the presence therein of about 3% of sodium acetate ($NaC_2H_3O_2$).

5. The method of inhibiting thickening and gelling of a liquid dispersion of malodorant-free plastic polymerized chloroprene in an organic solvent, which comprises incorporating in said dispersion a salt of the group consisting of sodium formate and sodium acetate.

ALEXANDER D. MACDONALD.